(12) United States Patent
Waesterlid

(10) Patent No.: US 6,993,325 B1
(45) Date of Patent: Jan. 31, 2006

(54) METHOD FOR FACILITATING ELECTRONIC COMMUNICATIONS

(75) Inventor: Anders Waesterlid, Stuvsta (SE)

(73) Assignee: Ericsson Inc., Research Triangle Park, NC (US)

( * ) Notice: Subject to any disclaimer, the term of this patent is extended or adjusted under 35 U.S.C. 154(b) by 579 days.

(21) Appl. No.: 09/514,657

(22) Filed: Feb. 29, 2000

(51) Int. Cl.
*H04M 3/42* (2006.01)
*H04M 11/10* (2006.01)

(52) U.S. Cl. ............................... 455/414.1; 455/412.1; 455/466; 379/88.12; 379/88.17; 379/88.25

(58) Field of Classification Search .............. 379/67.1, 379/88.04, 88.12, 88.13, 88.17, 88.18, 88.22, 379/88.25, 908; 455/518, 519, 412, 414, 455/466

See application file for complete search history.

(56) References Cited

U.S. PATENT DOCUMENTS 5,412,654 A * 5/1995 Perkins ...................... 370/312

FOREIGN PATENT DOCUMENTS

WO    WO 98/17032    * 4/1998

OTHER PUBLICATIONS

Rosenberg et al. IETF Internet Draft, Bell Labs, Columbia University, Nov. 13, 1998, pp. 1-18.*
NetMeeting 2.1. features, Microsoft Corporation, last updated Jan. 5, 1998. pp. 1-6.
Rosenberg, J.; Schulzrinne, H.; "Internet Engineering Task Force Internet Draft"; Bell Laboratories, Columbia U., Nov. 13, 1998, pp. 1-18.
Appenzeller, G.; Lai, Kevin; Maniatis, Petros; Roussopoulos, Mema; Sweirk, Edward; Zhao, Xinhua; Baker, Mary; "The Mobile People Architecture", Jan. 1999. pp. 1-13.

* cited by examiner

*Primary Examiner*—Stephen D'Agosta
(74) *Attorney, Agent, or Firm*—Coats & Bennett, P.L.L.C.

(57) ABSTRACT

A communication method allows members of an affinity group to obtain up-to-date information concerning the status of other members of the affinity group. Each member of the affinity group is provided with a communication device for communicating with other members. The communication device includes a memory for storing member status information. When the status of one member in the affinity group changes, a status update message is sent from the member whose status has changed to other members of the affinity group. When a status update message is receiving from other members, the status information data contained in the message is used to update the member status information stored in memory.

20 Claims, 10 Drawing Sheets

METHOD FOR FACILITATING ELECTRONIC COMMUNICATIONS

FIELD OF THE INVENTION

The present invention is relates generally to mobile communications devices and more particularly, to a method for establishing affinity groups that enable members of the group to send status information to and receive status information from other members of the affinity group.

BACKGROUND OF THE INVENTION

One reason for the popularity of portable, wireless communication devices, such as cellular phones, is that it frees people from tethers to fixed communication networks. A user can roam freely in the network, yet remain in touch with others. Thus, mobile communication devices provide a means by which people can remain in contact with whomever they want, wherever they happen to be. This is especially true among groups of individuals who share a common interest or affiliation (e.g. families, co-workers, those who share a common avocation or interest, such as tennis or music, and members of a club). Such groups shall be referred to herein as an affinity group.

Several existing technologies facilitate interaction among the members of an affinity group: Internet "chat rooms," electronic mail (e-mail), advanced personal information management (PIM) applications such as Microsoft® Outlook, paging services, and advanced messaging services employing contact servers. Some Internet chat software, for example AOL® Instant Messenger™, ICQ or other similar programs, inform members of an affinity group which other members of the group are currently logged into the server. Microsoft Outlook provides a means for automatically scheduling meetings and notifying participants based on available time shown on each individual's calendar. Some advanced messaging services employing contact servers provide information on how to best contact a particular individual based on the person's stored schedule or preferences. In some cases, the assistance may even extend to automatically setting up a call using the best possible known method at that time.

All these technologies support, to some degree, the desire of members of an affinity group to stay in close contact. The Internet chat room approach of informing the user which affinity group members are on-line is particularly useful. However, this approach has limitations, the most serious of which is that the user must be logged onto the Internet and in contact with a particular server to receive information on the status of the other group members. For example, suppose a first group member would like to chat with a second member. The first member has no way of knowing whether the first member is logged onto the chat server without first logging onto the server himself.

Therefore, there is a need for a communication method that allows members of an affinity group to receive up to date status information about other group members without having to log into a server.

SUMMARY OF THE INVENTION

The present invention is a connectionless status reporting method that allows members of an affinity group to send status information to and receive status information from other members of the affinity group. The invention provides members of the affinity group with up-to-date information concerning the status of other members in the affinity group without having to establish a connection to a server to obtain such information. This makes it easier to contact members of the affinity group and to avoid common communication pitfalls, such as voice mail, phone tag, etc.

The present invention is particularly well-suited for mobile communication networks, though it can be applied to advantage in fixed networks as well. Each member of the affinity group is provided with a communication device, such as a cellular phone or personal digital assistant (PDA). The communication device includes a memory for storing member status information. An application running on the member's communication device monitors the member's status and sends a status update message to other members when a status change is detected. Status update messages may be sent directly from one member to another, or, alternatively, be sent to a centralized messaging server which then forwards the message to all other members. When a member receives a status update message from another member, the application running on the member's device updates the member status information stored in memory to reflect the current status of the member. The member can view member status information on a display to determine the status of a particular member.

In a preferred embodiment of the invention, the application can be programmed to allow each member to select the particular status items that the member wants to report to other members of the group. Also, status reporting can be limited to particular periods of time, such as during working hours.

An advantage of the present invention is that each member receives status updates concerning other members as long as the member's communication device is turned on. Status reporting is performed automatically and there is no need for the member to establish a connection to a server to obtain status information concerning other members. The user simply retrieves the latest status information from the memory of his communication device.

DETAILED DESCRIPTION OF THE PREFERRED EMBODIMENT

Figure 1:
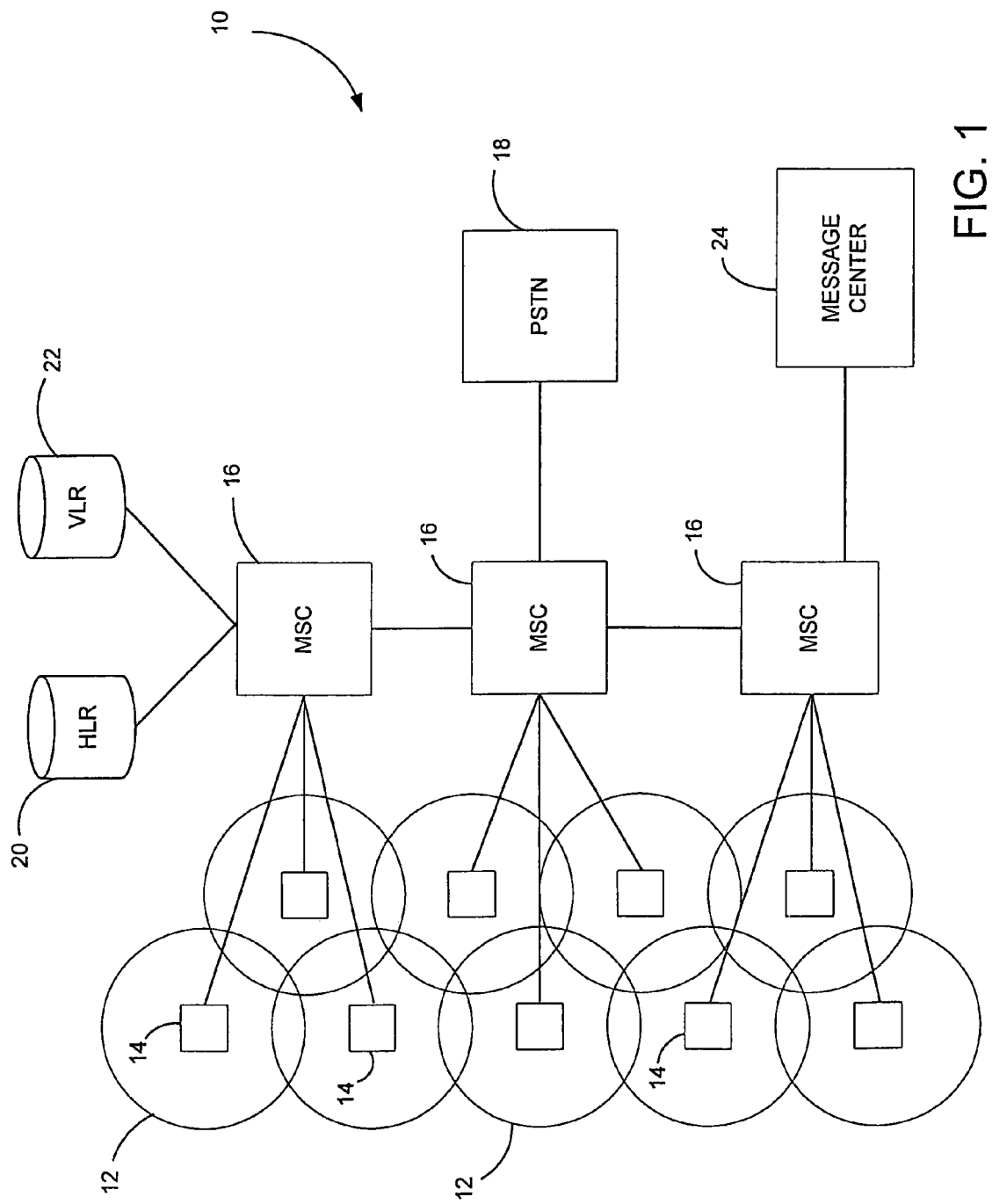
FIG. 1 shows a block diagram of a mobile communication network used to implement the communication method of the present invention.

The present invention is a communication method that allows members of an affinity group to send and receive status information to one another. The communication method is implemented in a communication network, such as a mobile communication network shown in FIG. 1. The present invention is not, however, limited in its application to mobile communication networks, but may also be used in fixed networks. As seen in FIG. 1, the cellular communication system comprises a plurality of cells 12 that provide radio coverage throughout the network. Each cell 12 is served by a base station 14 that provides radio coverage to mobile communication devices 100 within that particular cell. The base stations 14 are connected to a Mobile Services Switching Center (MSC) 16. Typically, a cellular network will include many MSCs 16. At least one MSC 16 in the network is connected via a gateway to the Public Switched Telephone Network (PSTN) 18. Some MSCs 16 also serve as gateways connecting the network 10 with other cellular networks. The function of the MSCs 16 is to route calls and signals in the network to the appropriate destination. For example, the MSC is responsible for connecting calls to the appropriate base station or to the PSTN or other connected network via a gateway. The mobile radio communication devices 100 may be cellular telephones, PCS phones, personal digital assistants (PDAs), pagers, or other similar devices that communicate over RF channels. The base stations 12 are connected to mobile service switching centers MSCs 16.

In order to perform its call routing function, the MSC 16 must know the location of the mobile phones in the PLMN network so that calls can be forwarded to the appropriate base station. Information concerning the whereabouts of each mobile phone is stored in databases that are centrally located in the network. Each service provider will typically maintain its own database containing subscriber information which is shared with other networks in the PLMN. These databases include the Home Location Register (HLR) 20 and the Visitor Location Register (VLR) 22.

The HLR 20 is used to store information concerning subscribers to a cellular network. This information typically includes the user's name and address for billing purposes, the serial number of the user's mobile phone, and the services to which the user is entitled to receive. In addition, the current location of the subscriber is stored in the HLR 20 for retrieval by an MSC 16 to use in routing calls to the subscriber. The mobile unit registers with the servicing MSC 16 when it is powered on and at periodic intervals so that the servicing MSC 16 can keep track of the location of the mobile unit. The mobile unit also registers when it travels between two different service areas (areas served by different MSCs). As part of this registration procedure, the mobile unit transmits its Mobile Identification Number (MIN) to the MSC 16. The MSC 16 uses the MIN to determine which HLR 20 to access. When the mobile unit registers with MSC 16, the servicing MSC 16 updates the HLR 20 with the current location of the mobile phone. When an MSC 16 receives a call addressed to a subscriber that is not currently in that MSC's 16 service area, the MSC 16 will query the HLR 20 for the subscribers location so that the call can be forwarded to the MSC 16 currently servicing the subscriber.

The VLR 22 is used to store information about users that are not in their home service area. When subscribers roam outside of their home service area, the VLR 22 in the area being visited must keep track of the subscriber's location and be able to verify the Mobile Identification Number (MIN) of the mobile telephone. The VLR 22 in the area being visited queries the HLR 20 in the subscribers home service area to authenticate the subscriber and determine the services to which the subscriber is entitled. Information concerning the user is stored in the VLR 22 as long as the subscriber remains in the service area. The VLR 22 also stores the current location of the subscriber. The subscriber's current location is also communicated back to the home HLR 20 so that the home network will know how to forward calls addressed to the subscriber who is currently outside of the home network.

Many cellular networks 10 implement a service called the short message service. This service allows mobile users to send a receive short text messages. Messages originating from, or terminating at, a mobile phone 100 in the network are stored in a message center 24 connected to an MSC. The message center 24 is a store-and-forward device or system that is used to support teleservices like cellular messaging. The typical interfaces to the message center 24 allow direct dial-in access, computer interface for e-mail delivery to phones, or human operator input for paging services. Mobile-originated SMS messages are initially forwarded to the MSC 16 servicing the addressed mobile phone 100 and routed by the MSC 16 to the message service center 24 where the SMS message is stored. The MSC 16 searches for the targeted mobile phone 100 and alerts the mobile phone 100 that a message is coming. The mobile phone 100 tunes to a designated messaging channel (typically an SDCCH channel) where it waits for the SMS message. The MSC 16 then forwards the SMS message to the mobile phone 100 on the designated channel and waits for an acknowledgement from the mobile phone 100 confirming receipt of the message. If an acknowledgement is received from the mobile phone 100, the message is removed from storage. If receipt of the message is not acknowledged, the MSC 16 may attempt to deliver the message again.

Figure 2:
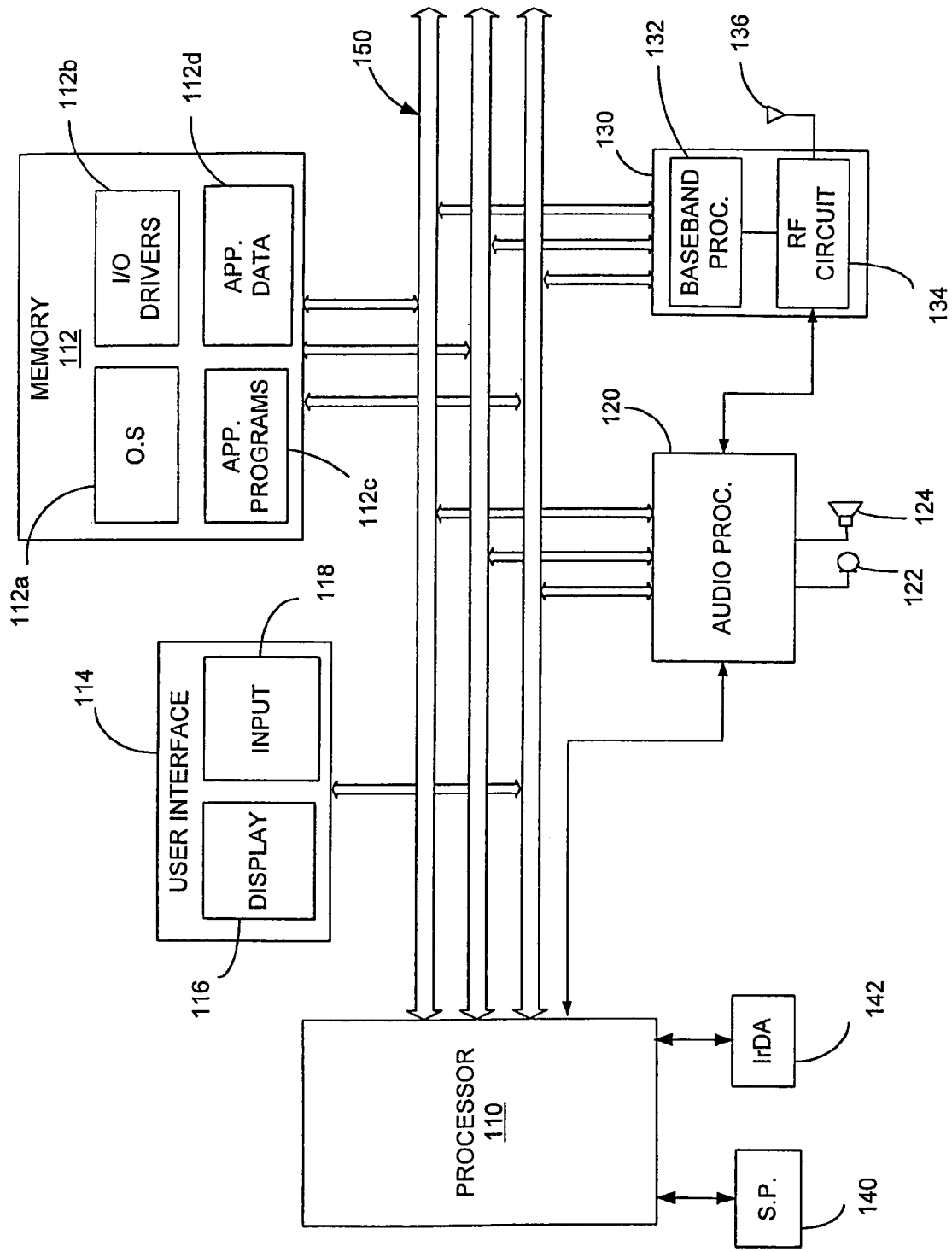
FIG. 2 is a block diagram of a mobile communication device used to implement the communication method.

Referring now to FIG. 2, a communication device 100 that implements the present invention is shown. The particular embodiment disclosed is a personal digital assistant (PDA) though other types of communication devices, such as cellular phones and pagers could also be used. PDA 100 combines a cellular radio transceiver with a hand-held computer. The PDA 100 includes a microprocessor 110, program memory 112, user interface 114, including a display 116 and an input device 118, audio processing circuits 120, and a transceiver section 130 connected together by a system bus 150 having address, data, and control lines. The PDA may also include an infrared and serial interfaces, 140 and 142 respectively, for exchanging data with other devices.

The microprocessor 110 controls the operation of the device according to instructions stored in memory 112. The processor 110 can be any commercially available or custom microprocessor suitable for an embedded application. The memory 112 is representative of the overall hierarchy of memory devices containing the software and data used to implement the functionality of the communication device 100. The memory 112 can include, but is not limited to, the following types of devices: cache, ROM, PROM, EPROM, EEPROM, flash, SRAM, and DRAM. As shown in FIG. 2, the memory 112 may hold four major categories of software and data used in the computing device: the operating system 112*a*; the input/output (I/O) device drivers 112*b*; the application programs 112*c*; and the application program data 112*d*.

The operating system 112*a* is typically designed for embedded applications and, preferably, is relatively compact to make the most efficient use of the memory. One such example of an operating system meeting these criteria is the EPOC operating system sold by Symbian Ltd., Sentinel House, 16 Harcourt St., London W1H 1DS UK, which was developed for portable hand-held computers and can be used in a preferred embodiment of the present invention.

The I/O device drivers 112b include software routines that are accessed through the operating system 112a by the application programs 112c to communicate with devices such as the display 116, certain components of the memory, and I/O ports such as a serial port 140 or infra red (IR) port 142 for transferring data to another device or system.

The application programs 112c comprise the programs that implement the various application functions of the computing device 100. The application programs may include software to implement features such as e-mail, Internet access, word processing, or contact management. The present invention relates particularly to a messaging application residing in memory 112c. The messaging application 112c may be a stand-alone application or may be a component of a larger application, such as a contact manager. The static and dynamic data used by the application programs 112c is represented by the application data 112d.

The user interface 114 includes a display 116 and a user input device 118. Display 116 enables the user to view stored information, such as user status information. The input device 118 may be any known input device for a computing device including without limitation a keypad, pointing device (such as a mouse, trackball, touch pad, or light pin), or touch screen. Voice activation could also be used for user input.

The transceiver section 130 is a fully functional cellular transceiver capable of transmitting and receiving radio signals. The details of transceiver section 130 are conventional and well known to those skilled in the art. To briefly describe, the transceiver 130 of the preferred embodiment includes a digital signal processor 132 for processing signals transmitted and received by the device 10, and an RF circuits 134 connected to an antenna 136. Since transceivers 130 are well-known in the art and are not per se material to the present invention, further description of the transceiver 130 is omitted for the sake of brevity.

The audio processing circuits 120 are shared by the transceiver 130 and application programs 112c executed by the processor 110. A microphone 122 converts audible sounds, such as voice, into electrical signals that are input to the audio processing circuits 120. The processed audio signals can be transmitted by said transceiver 130 or used by an application program in memory 112c. A speaker converts audio signals output by said audio processing circuits into audible sounds that can be heard by the user. The audio signals may be received by said transceiver 130, generated by an application program in memory 112c, or retrieved from memory 112d.

The messaging application stored in memory 112c enables members of an affinity group to obtain up-to-date status information about other members of the affinity group without the need to first connect to or poll a server. The status information for each group member may include, but is not limited to, the following status items:

1) current state of the members communication device 100,
2) current activity (e.g. work, meeting, lunch, traveling, of-duty, etc.), and
3) current location.

These are but a few examples of the types of status information that can be shared with members of the affinity group.

Figure 9:
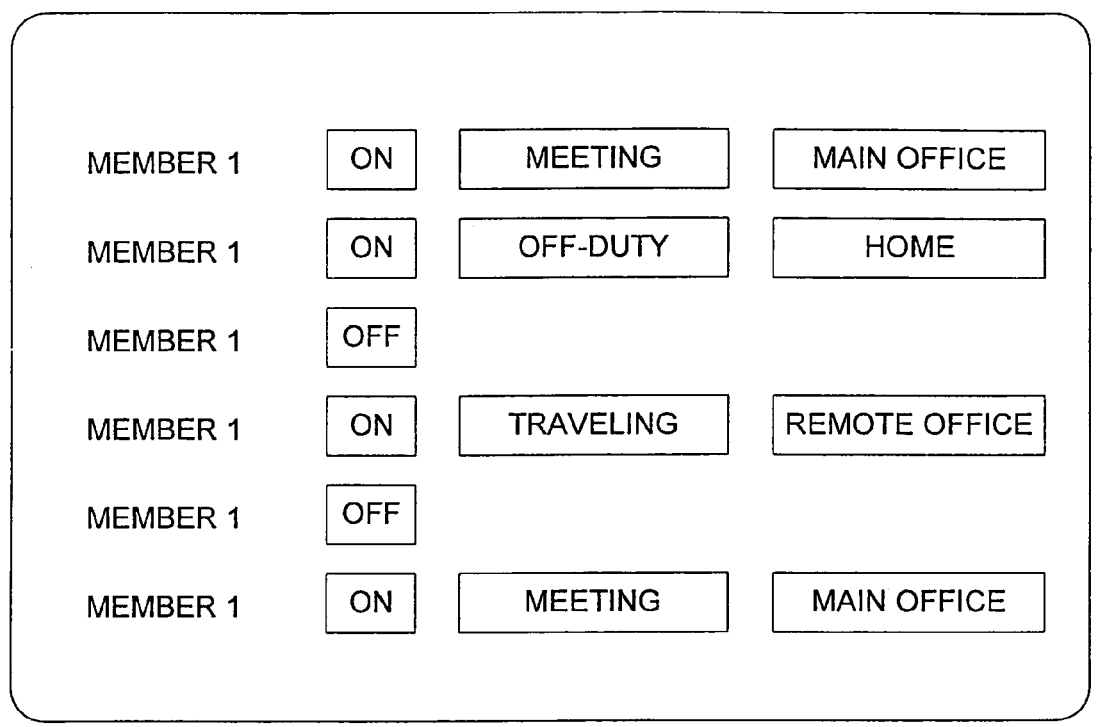
FIG. 9 is a drawing of a user interface showing how member status information is displayed for viewing.

FIG. 9 illustrates an example display screen, which might be used by a client application running on a member's mobile communication device 100. The display 60 lists members of the affinity group along with the pertinent status information of each listed member. There are many other ways in which the status information could be displayed. The particular manner chosen to display status information is not material to the invention, but is shown to facilitate the understanding of the invention.

Figure 3:
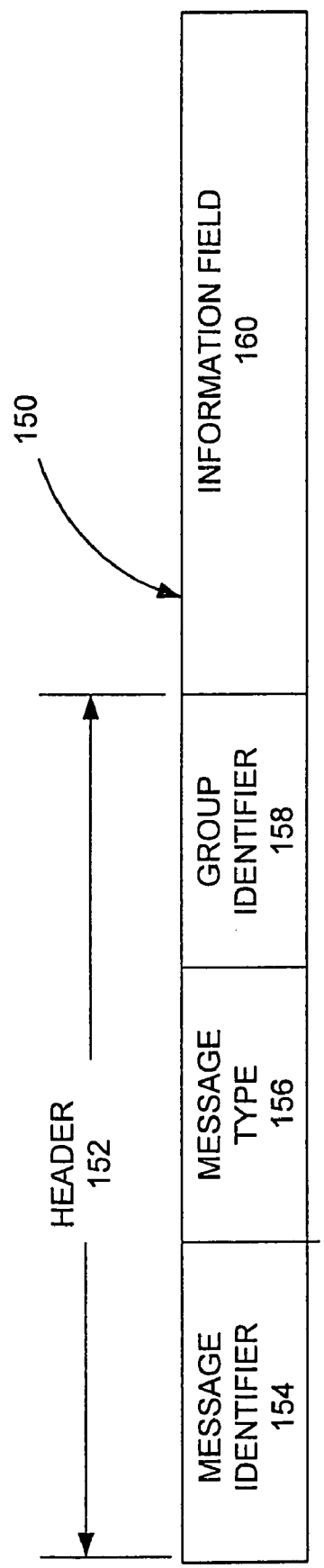
FIG. 3 is a diagram showing the general format for message used to implement the communication method.

In order to implement the status reporting method of the present invention, it is necessary for the messaging applications running on different users' communication devices 100 to exchange messages 150. FIG. 3 shows the general format for all messages 150 used by the messaging applications. The content of particular messages 150 will be described in detail below. Each message 150 includes a header 152 comprising a Message Identifier field 154, Message Type field 156, and Group Identifier field 158. The header 152 is followed by an Information field 160 that varies from one type of message to another. The Message Identifier field 154 contains a flag that indicates to the receiving device 100 that the message is for the messaging application so that the receiving device can decode and route the message to the messaging application. The Message Type field 156 indicates the type of message contained in the packet (e.g. Membership Request message, Membership Reply message, Status message, Group Update message, etc.). The various types of messages are described below. The Group Identifier field 158 contains a unique identifier for the affinity group so that the application can discriminate between messages for different groups. This feature allows the user to join a plurality of different affinity groups.

Two distinct approaches may be taken to communication between group members. The preferred approach is the client server approach illustrated in FIG. 4. In this approach, a messaging server 170 is installed at a central location in the network 10, such as the messaging center 24. Client applications 172 are installed in individual member's communication devices 100. The messaging server 170 is responsible for maintaining a master group database. Individual clients also maintain member status information in a member database or file. The short message service is used to transmit messages between the messaging server 170 and the clients 172 running on the individual member's communication devices 100. One advantage to using the short message service is that it allows the present invention to be easily implemented in any system where the short message service is already being used. A messaging server 170 can be easily installed at the messaging center 24 without significant modifications.

Figure 5:
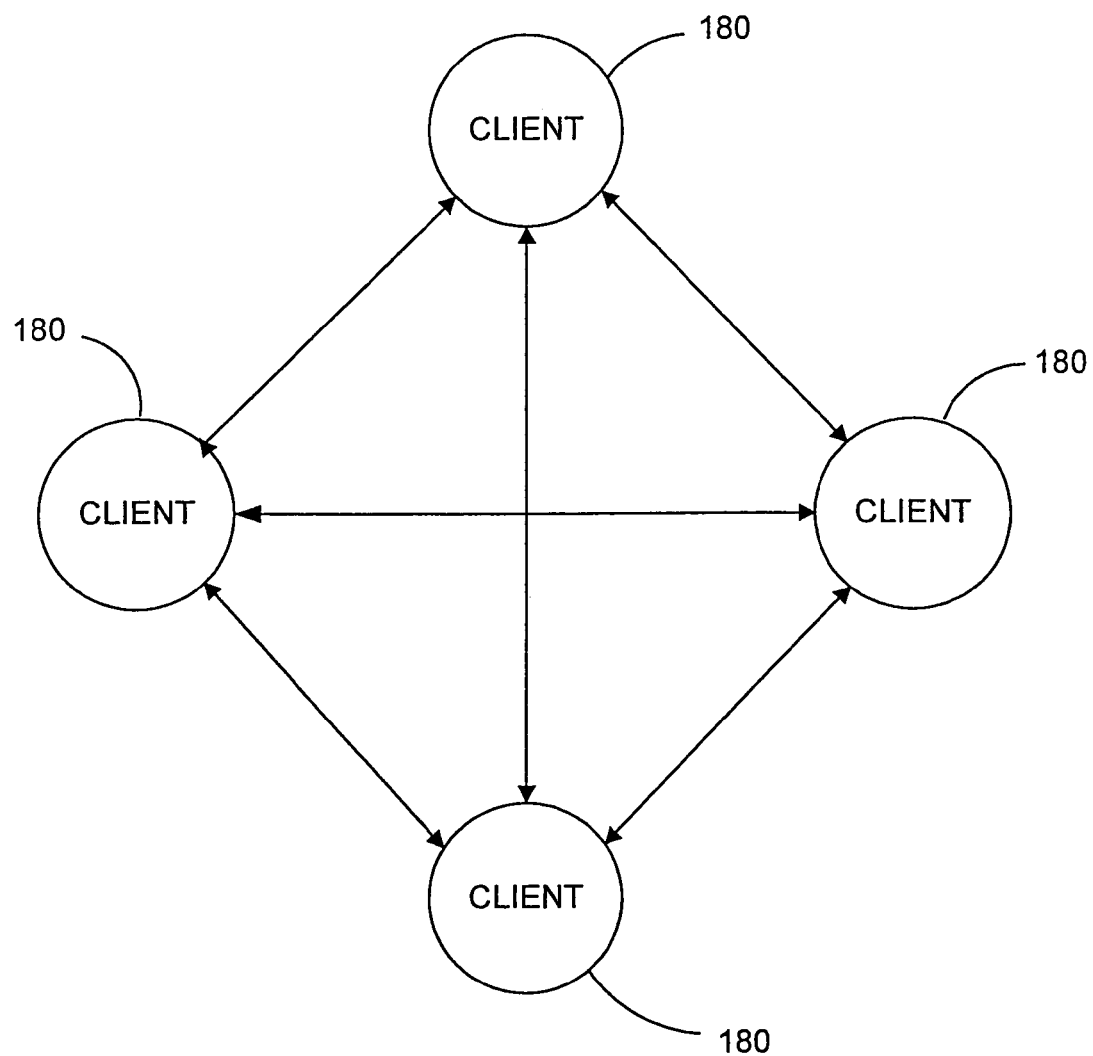
FIG. 5 is a block diagram of an affinity group using a peer-to-peer approach.

An alternative approach, called the direct messaging or peer-to-peer approach, is shown in FIG. 5. In this approach, each communication device 100 is a peer 180 and communicates directly with other peers 180 in the group. There is no centralized server or database. Instead, each peer 180 in the group is responsible for maintaining its own database for each group in which that peer 180 is a member. Messages are sent as datagrams via the communication network 10 directly from one peer 180 to another. For example, when the status of a member changes, the peer 180 sends a Status Update message to every other peer 180 in the affinity group. This direct messaging or peer-to-peer approach has the drawback of requiring numerous uplink messages to be sent by the peer 180, particularly where the affinity group is large. On the other hand, the peer to peer approach does not depend on the network or a centralized server in order to function. The peer to peer approach can therefore be implemented in any network that supports datagram signaling between clients.

Messaging Procedures

The messaging procedures are largely independent of the particular communication method chosen. According to the present invention, a user creates an affinity group and then sends a Membership Request message inviting one or more other users to join the affinity group. The user creating the affinity group becomes the owner of the group and is referred to as the group administrator. Recipients of the Membership Request message can reply to the invitation by sending a Membership Reply message either accepting or declining the invitation to join the affinity group. Those accepting the invitation are added to the group along with the group administrator. After joining the affinity group, each existing member receives a Group Update message from the group administrator or messaging server containing the names of the other members to the affinity group. New members may also receive a Group Update message, but in this case, the message will contain information concerning the existing members and their current status.

A member of the affinity group can withdraw from the group by sending a Resignation message to the group administrator or messaging server. Receipt of a Resignation message by the group administrator or messaging server spawns a Group Update message deleting the resigning member from the group.

Once affinity group is established, Status Update messages are transmitted by members whenever their status changes. The client application monitors the user's status and reports any status changes to the messaging server or other group members. The Status Update messages allow all members of the affinity group to be kept abreast of the status of other members in the affinity group. As will be explained in more detail below, the member can customize the application to specify the type of status information that the member wants to disclose to other members.

Figure 4:
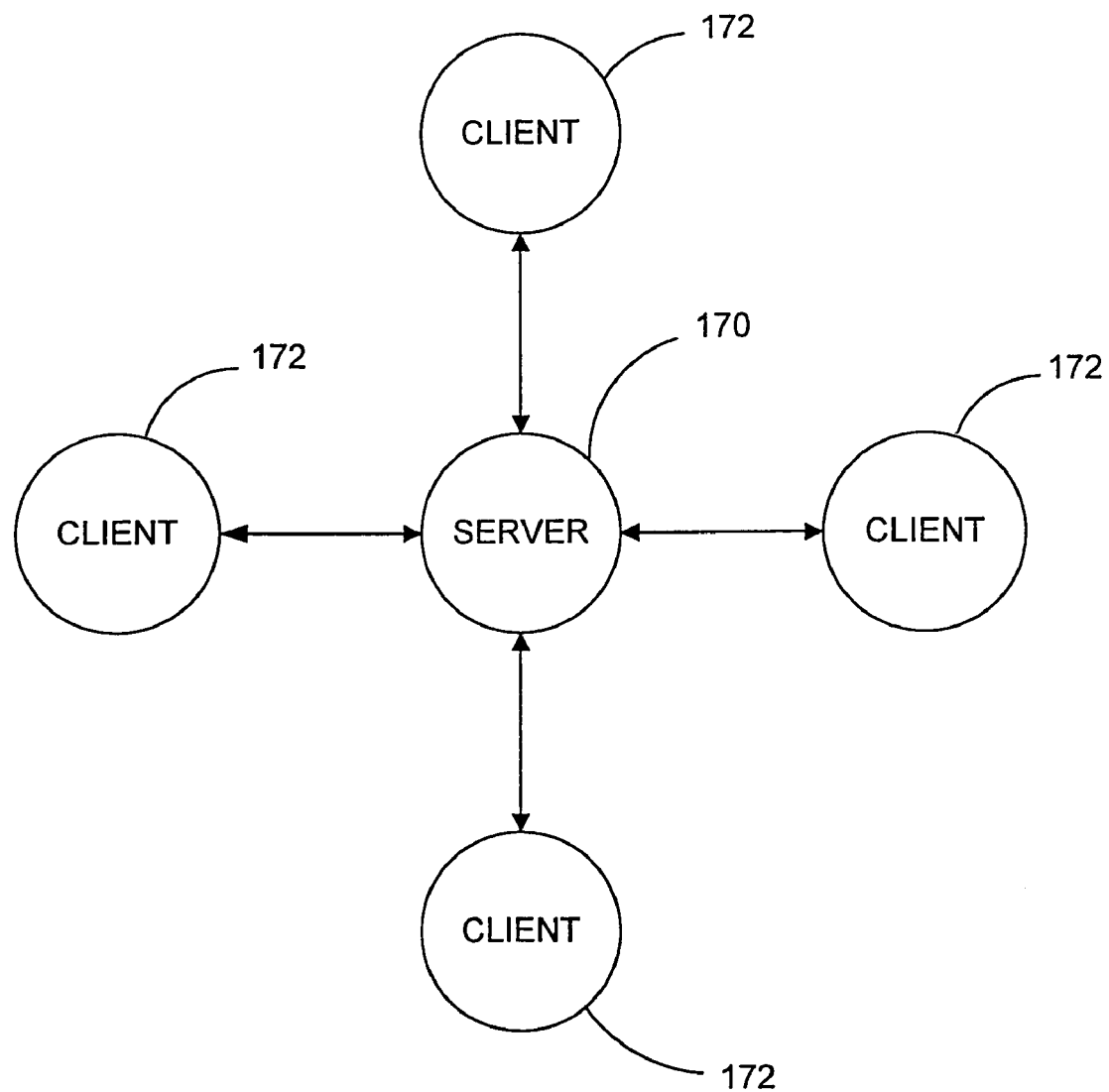
FIG. 4 is a block diagram of an affinity group using a client/server approach.
Figure 6A:
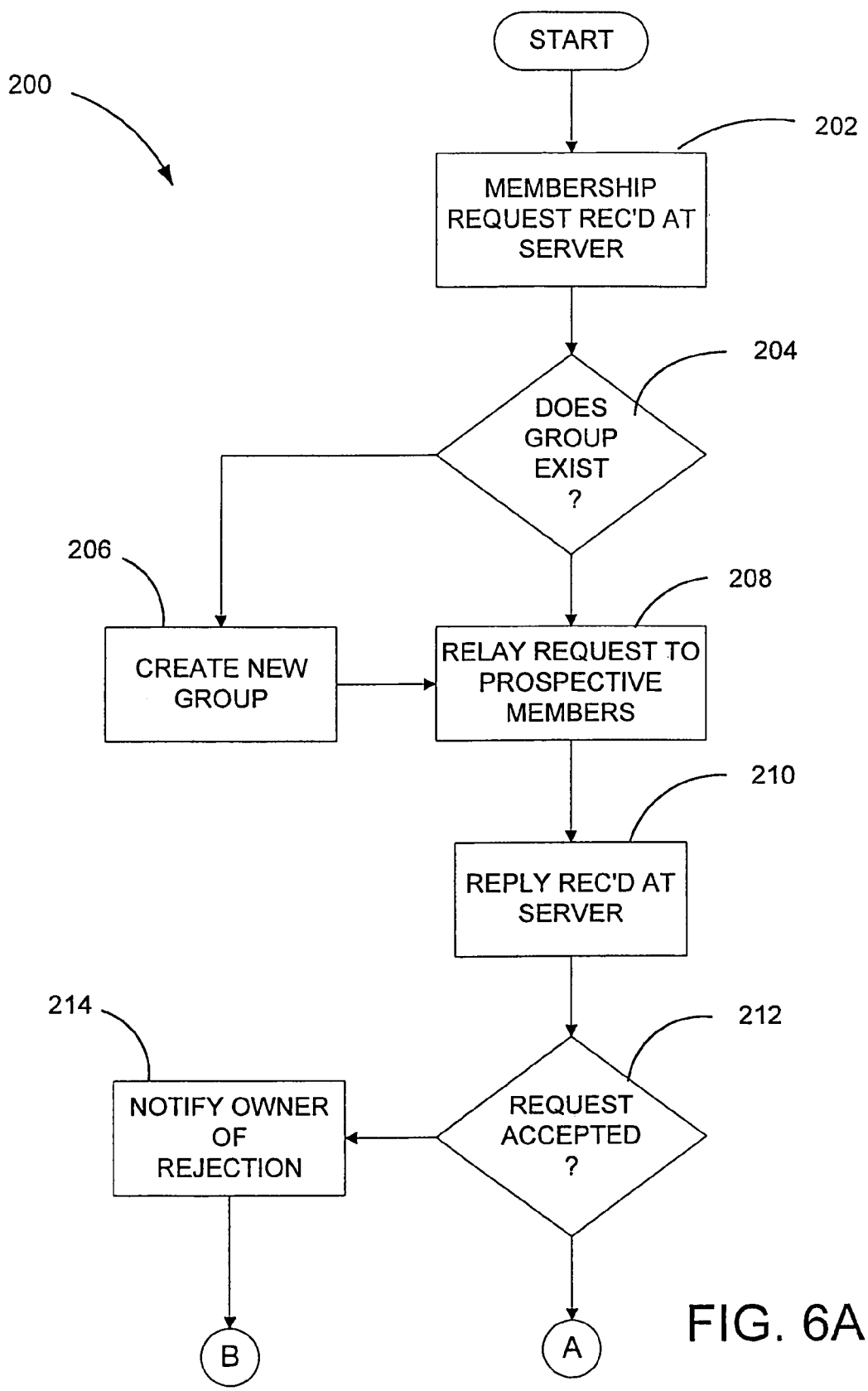
FIGS. 6A and 6B are a flow diagram of a set-up procedure used to create a new affinity group or to add a new member to an existing group.
Figure 6B:
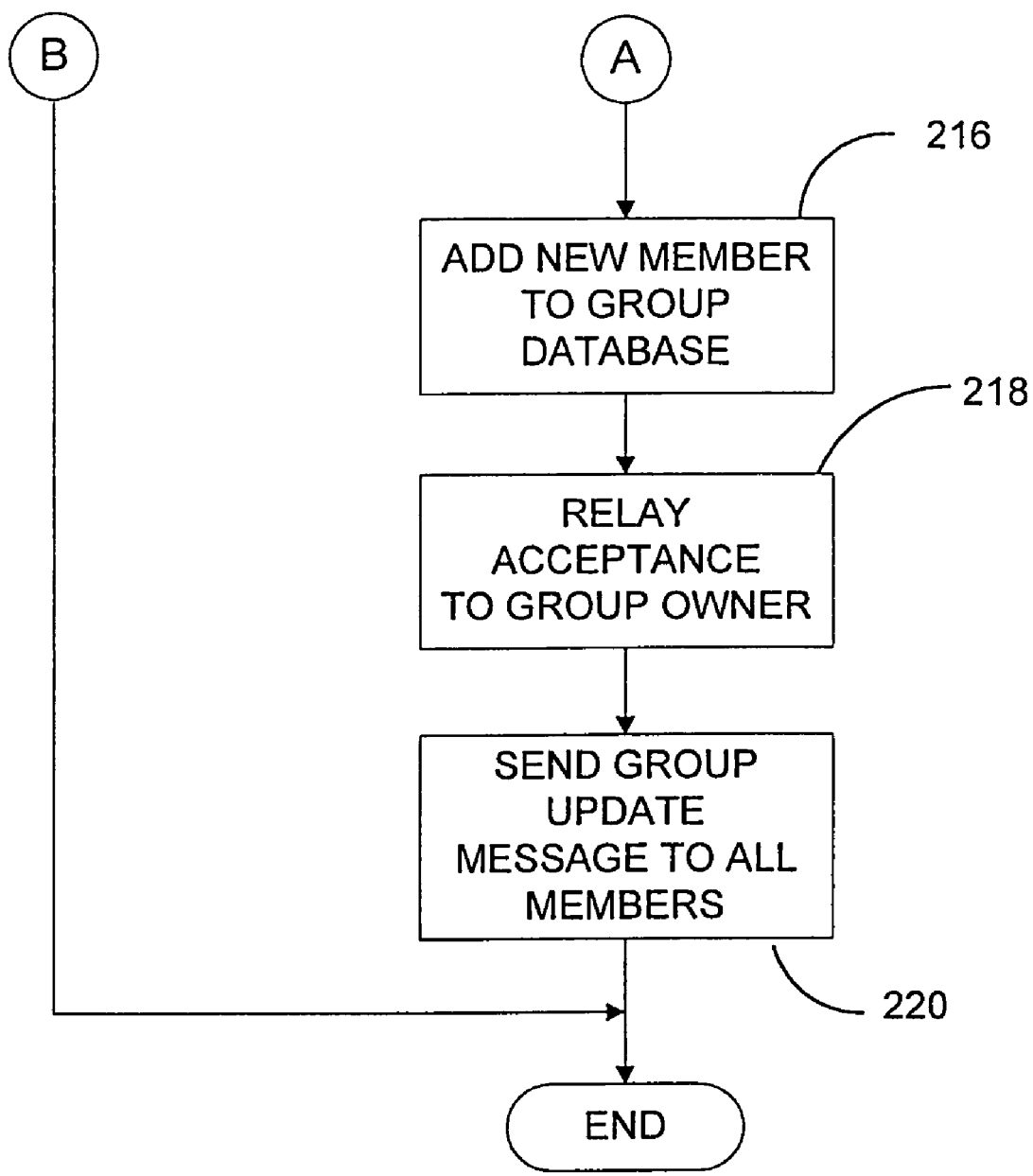
Figure 7:
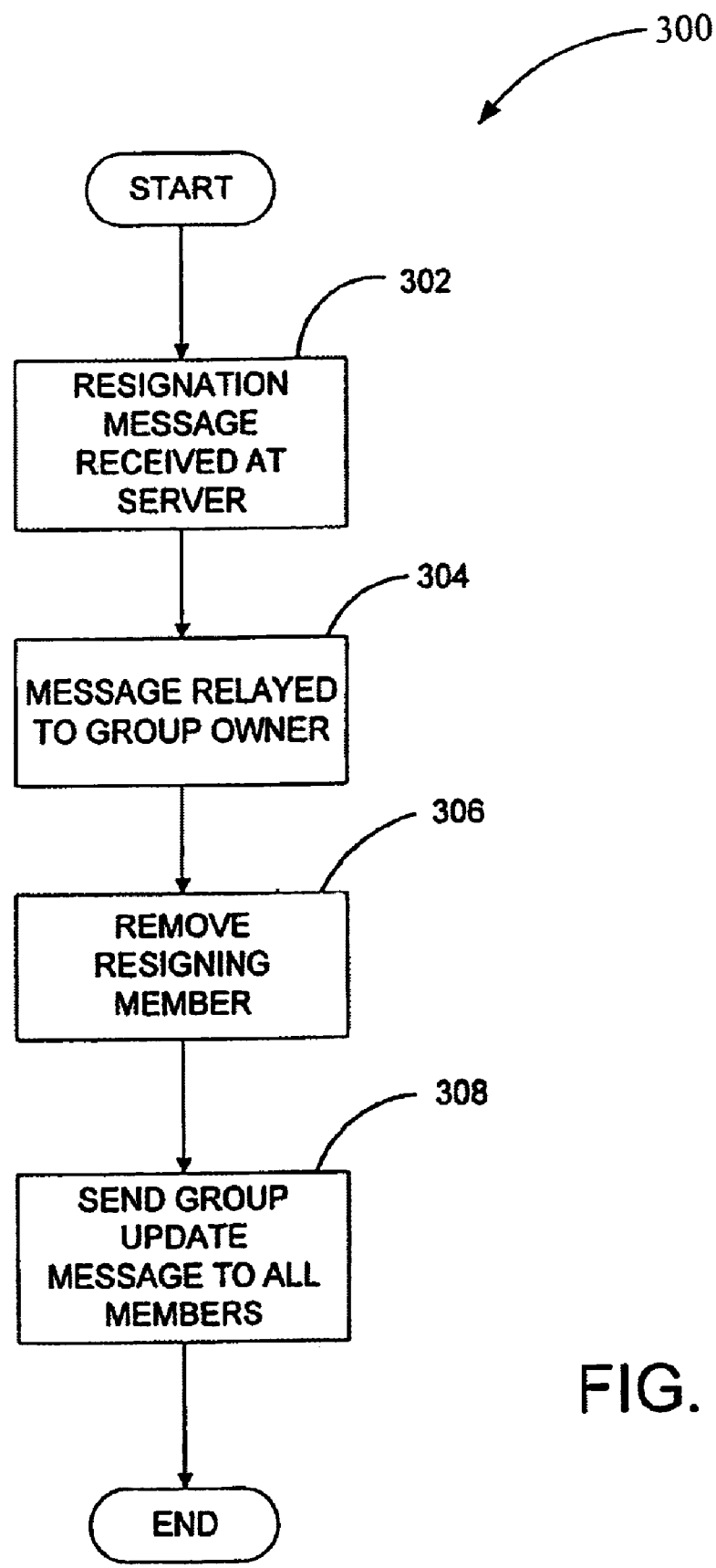
FIG. 7 is a flow diagram of a resignation procedure for removing members from an existing group.
Figure 8:
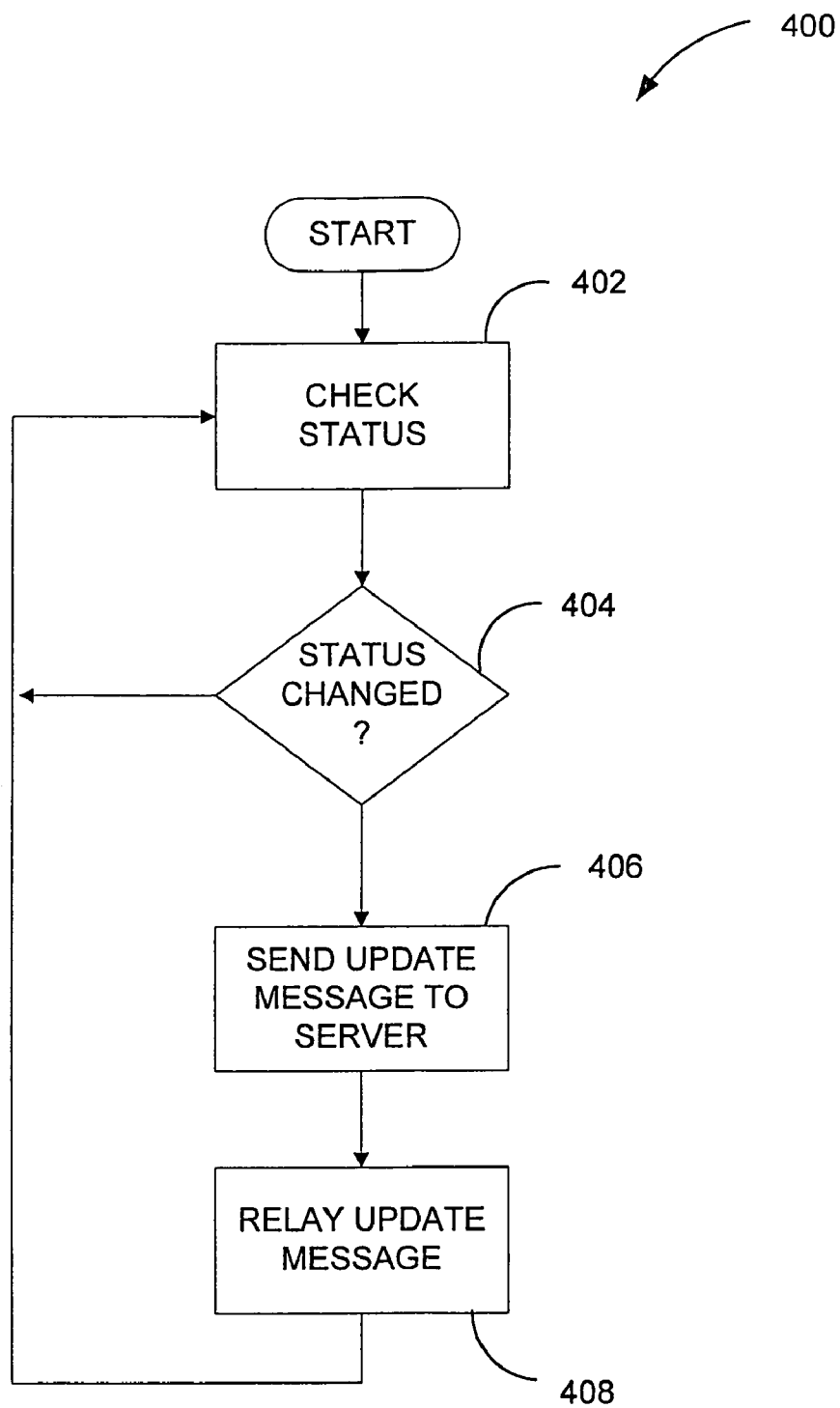
FIG. 8 is a flow diagram of a status update procedure for updating the status of a group member.

FIGS. 6–8 illustrate the various procedures for establishing a group and reporting status information in a system using a centralized messaging server as shown in FIG. 4. These procedures can be readily adapted for use in a peer to peer system.

FIG. 6 is a flow diagram illustrating an exemplary setup procedure 200 for establishing a new affinity group or adding a new member to an existing group. A first user sends a Membership Request message via the messaging server 170 to one or more prospective members whom the first member would like to join the affinity group (block 202). The Membership Request message specifies a particular affinity group to which the request applies. The messaging server 170 determines whether the group specified in the Membership Request message already exists (block 204). If the group already exists, then the messaging server 170 simply relays the message to the addressed parties (block 208). If not, it creates a new affinity group and designates the first user as the group administrator (block 206). The Membership Request message is then forwarded by the messaging server 170 to the addressed parties (block 208). Only the group administrator can send a Membership Request message. The invitation to join an affinity group may be time limited. The time period to join may remain open for a predetermined time period that is set by default or for a time period that is specified by the group administrator in the Membership Request message.

The format of a Membership Request message is shown in Appendix A. Since the number of members is constantly changing, the length of the message is variable. As shown in Appendix A, the Membership Request message contains data corresponding to each member of the affinity group. The member data may include, for example, the name, address, telephone number, and current status of each member.

When the Membership Request message is received, the client application on the member's device displays the member information so that the receiver of the message can decide whether to join the affinity group. Prospective members who receive the Membership Request message can either accept or decline the invitation to join an affinity group by sending a Membership Reply message. When a Membership Reply message is received at the server 170 (block 210), the server 170 decodes the message and determines whether the prospective member has accepted or rejected the invitation to join the affinity group (block 212). The format of a Membership Reply message is shown in Appendix A. The Membership Reply message is a fixed length message. The Information field of a Membership Reply message includes only a response flag that indicates whether the prospective member has accepted or rejected the invitation to join the affinity group.

When a prospective member accepts a Request for Membership message, the client application on the new member's communication device 100 creates an affinity group database and stores it in memory. A record is created in the database or file for each member of the affinity group. Each user record is populated with the corresponding member data contained in the Membership Request message.

If the prospective member declines the invitation, the server 170 relays the Membership Reply message to the group administrator and no further action is taken (block 214). If the prospective member accepts the invitation, the server adds the prospective member to a member database stored in memory (block 216) and forwards the acceptance to the group administrator (block 218). A Group Update message is then sent to all current members (block 220). The Group Update message may be generated automatically by the server 170 or the client application running in the group administrator's communication device 100. In the latter case, the Group Update message is sent to the messaging server 170 and then forwarded to each member of the affinity group. The Group Update message contains a list of all members of the group, including the newly added member. The Group Update message may also include other information about the new member, such as home or business address, occupation, telephone number, or other pertinent information if desired.

The format of a Group Update message is the same as the Membership Request message, however, the Message Type field is different to distinguish it from the Membership Request message. The Group Update contains a complete list of Group Members and is sent to all members of the group. When the Group Update message is received by a member, the client application on the member's communication device 100 takes appropriate action to add, delete, or modify member records in the corresponding group database.

FIG. 7 illustrates the resignation procedure 300 for withdrawing from an affinity group. A resigning member sends a Resignation message to the messaging server. When the Resignation message is received (block 302), the server forwards the Resignation message to the group administrator (block 304) and then removes the resigning member from the group database (block 306). The group administrator or messaging server then generates a new Group Update message deleting the resigning member (block 308). After receiving the Group Update message, the client software on the member's communication device 100 deletes the resigning member from its records.

FIG. 8 is a flow diagram illustrating the procedure 400 for updating status information. The flow chart is a composite of the actions taken by both the client and server applications. In the preferred embodiment, the client application 172 operates in the background to monitor the member's status (block 402). Periodically, the client application checks to see if the members status has changed (block 404). If no change in status has occurred, no action is taken and the client application continues monitoring (block 402). When a status change is detected, the client application automatically sends a Status Update message to the messaging server (block 406). The user could cause a status update message to be sent by entering a new status. The format of the Status Update message is shown in Appendix A. The Status Update message includes, in the information field, a member status record field that contains data reflecting the current status of that member. The member status record field includes a Member Identifier field, an On/Off Status field, an Activity Status field, and a Location field. The messaging server relays the Status Update message to all members using the broadcast short message service (block 408). The server may combine Status Update messages received from different clients into a single message to reduce the number of messages that must be transmitted. An example of a combined Status Update message is shown in Appendix A. The Status Update message contains a plurality of member status record fields. Generally, there is one member status record field for each member whose status has changed.

When a Status Update message is received by a client application, the client application takes appropriate action to update the group database to reflect the changes in member status (block 408). If desired, the client application can generate a signal to notify the user that a Status Update message has been received. The signal can be audible, visual, or tactile.

In the preferred embodiment of the invention, each member has the ability to specify what status information is made available to other members of the affinity group. Members may choose to communicate any subset of the three parameters discussed (on/off state, activity or location) or others that end users may create to the other members if the group. These preferences are preferably stored in the non-volatile memory in each member's communication device 100, or alternatively, at the messaging server 170. For applications in which parents may want to use the invention as a means to keep track of children (e.g. in an amusement park), a simple password security provision can be added so that the children cannot turn off the reporting of status information without the permission of a parent.

Further, in a preferred embodiment, the user can limit status reporting to predetermined time periods. For example, the user could program the client application 172 to send status updates only during a specified period. The period can be specified in any manner, such as by time. For example, the user could limit status reporting to daytime hours. Also, the user could specify a particular mode (e.g., work) corresponding to an activity status during which the user's status is reported. Equivalently, the user could suppress status reporting during a specified time period or mode.

The number of messages that must be sent by a client can be reduced by using available network information about phone on/off status or location. For example, the on/off status or location of the member can be reported to the messaging server by the HLR 22 eliminating the need for the client to report such information. The server 170 could then generate a Status Update message and send the Status Update Message to the members. In this embodiment, no uplink transmissions reporting changes in on/off status or location are needed. However, this would require that additional functionality be built into the network and may not be practical to implement in existing networks.

It should be appreciated that the present invention can be applied to fixed networks such as the Internet or local area network. For the same reasons that it is desirable to know the status of other portable communication device carriers, it may be desirable to know that a co-worker on a local area network is "in a meeting" or other status which may affect the desire of the user to contact the other member of the affinity group. Furthermore, it should be appreciated that the amount of information available in a single indoor wireless communication system, such as the Ericsson Freeset, is much greater. Specifically more information is immediately available at the location of each member of the group since the indoor base stations are generally fixed and known a priori.

The present invention may, of course, be carried out in other specific ways than those herein set forth without departing from the spirit and essential characteristics of the invention. The present embodiments are, therefore, to be considered in all respects as illustrative and not restrictive, and all changed coming within the meaning and equivalency range of the appended claims are intended to be embraced therein.

APPENDIX A

Message Format

Membership Request Message

Header

Message Identifier
Message Type
Group Identifier
Information Field

Member Data (member 1)
Member Data (member 2)
.
.
.
Member Data (member k)
Membership Reply Messages Header Message Identifier
Message Type
Group Identifier
Information Field Response Flag
  Group Update Message Header Message Identifier
Message Type
Group Identifier
Information Field Member Data (member 1)
Member Data (member 2)
. . .
Member Data (member n)

APPENDIX A-continued

Message Format

Status Update Message (format used by client)

Header

Message Identifier
Message Type
Group Identifier
Information Field

Member Identifier
On/Off Status
Activity Status
Location

Status Update Message (format for combined message)

Header

Message Identifier
Message Type
Group Identifier
Information Field

Member Status Record 1
Member Status Record 2
Member Status Record 3
. . .
Member Status Record n

What is claimed is:

1. A communication method implemented in a communication network for allowing members of an affinity group to send status information to and receive status information from other members of said affinity group, said communication method comprising:

forming an affinity group containing two or more members;

storing, in each individual members' communication device, status information concerning each other member of said affinity group;

when the status of any member in said affinity group changes, sending a status update message from said member whose status has changed to said each other member of said affinity group;

receiving said status update messages concerning each other member of said affinity group at said each other member's communication device; and updating said status information in said each other member's communication device when a status update message concerning said any member is received;

wherein said status information comprises a plurality of status items.

2. The communication method according to claim 1 wherein the status information includes at least one or more of the following status items: on/off status of the member; activity status of the member; and location of the member.

3. The communication method according to claim 1 wherein each individual member selects the status items from a list of available status items that are reported to each other member of the affinity group.

4. The communication method according to claim 1 further including the step of designating a period during which status updates are enabled.

5. The communication method according to claim 1 further including the step of designating a period during which status updates are suppressed.

6. A communication method implemented in a communication network for allowing members of an affinity group to send status information to and receive status information from other members of said affinity group, said communication method comprising:

forming an affinity group containing two or more members;

storing, in each individual members' communication device, status information concerning each other member of said affinity group;

when the status of any member in said affinity group changes, sending a status update message from said member whose status has changed to said each other member of said affinity group;

receiving said status update messages concerning each other member of said affinity group at said each other member's communication device; and updating said status information in said each other member's communication device when a status update message concerning said any member is received;

automatically detecting status changes of a member and sending status update messages to said each other member of said affinity group when a status change is detected;

wherein the status of a member is monitored by said member's communication device and wherein said communication device is programmed to automatically transmit a status update message to said each other member of said affinity group when a change in status is detected.

7. A communication method implemented in a mobile communication network for allowing members of an affinity group to send status information to and receive status information from other members of said affinity group, said communication method comprising:

a. forming an affinity group containing two or more members;

b. storing member status information data in each mobile communication device used by said members;

c. sending a first status update message from a first member's communication device to a centralized server when said first member's status changes;

d. forwarding said first status update message from said server to each other member of said affinity group, including a second member of said affinity group;

e. receiving said status update message at said second member's mobile communication device and updating said status information in said second member's mobile communication device when said status update message is received;

f. sending a second status update message from said second member's communication device to said centralized server when said second member's status changes;

g. forwarding said second status update message from said server to each other member of said affinity group, including said first member of said affinity group;

h. receiving said status update message at said first member's mobile communication device and updating said status information in said first member's mobile communication device when said second status update message is received.

8. The communication method according to claim 7 wherein said status information comprises a plurality of status items.

9. The communication method according to claim 8 wherein the status information includes at least one or more of the following status items: on/off status of the member; activity status of the member; and location of the member.

10. The communication method according to claim 8 wherein each individual member selects the status items from a list of available status items that are reported to each other members of the affinity group.

11. The communication method according to claim 8 further including the step of designating a period during which status updates are enabled.

12. The communication method according to claim 8 further including the step of designating a period during which status updates are suppressed.

13. The communication method according to claim 7 further including the step of automatically detecting status changes of a member and sending status update messages to said each other member of said affinity group when a status change is detected.

14. The communication method according to claim 13 wherein the status of a member is monitored by said member's communication device and wherein said communication device is programmed to automatically transmit a status update message to said affinity group when a change in status is detected.

15. The communication method according to claim 13 wherein the status of a member is monitored by a centralized server in said communication network and wherein status update messages are transmitted to other members in said affinity group when a member's status changes.

16. A mobile communication device for allowing a member of an affinity group to send status information to and receive status information from other members of said affinity group, said mobile communication device comprising:
   a memory for storing member status information data;
   a transmitter for transmitting status update messages to other members of said affinity group when said member's status changes;
   a receiver for receiving status update messages from other members of said affinity group;
   a processor operatively connected to said memory for writing status information to and reading status information from said memory, said processor being programmed to:
      generate a status update message when said member's status changes for transmission by said transmitter to each other member of said affinity group; and
      update said status information stored in said memory when a status update message is received from another member of said affinity group;
   wherein the member status information stored in said memory includes a plurality of status items.

17. The mobile communication device according to claim 16 wherein the status items include one or more of the following status items: on/off status of the member; activity status of the member; and location of the member.

18. A mobile communication device for allowing a member of an affinity group to send status information to and receive status information from other members of said affinity group, said mobile communication device comprising:
   a memory for storing member status information data;
   a transmitter for transmitting status update messages to other members of said affinity group when said member's status changes;
   a receiver for receiving status update messages from other members of said affinity group;
   a processor operatively connected to said memory for writing status information to and reading status information from said memory, said processor being programmed to:
      generate a status update message when said member's status chances for transmission by said transmitter to each other member of said affinity group; and
      update said status information stored in said memory when a status update message is received from another member of said affinity group;
   means for selecting the status items from a list of available status items that are reported to each other member of the affinity group.

19. A mobile communication device for allowing a member of an affinity group to send status information to and receive status information from other members of said affinity group, said mobile communication device comprising:
   a memory for storing member status information data;
   a transmitter for transmitting status update messages to other members of said affinity group when said member's status changes;
   a receiver for receiving status update messages from other members of said affinity group;
   a processor operatively connected to said memory for writing status information to and reading status information from said memory, said processor being programmed to:
      generate a status update message when said member's status chances for transmission by said transmitter to each other member of said affinity group; and
      update said status information stored in said memory when a status update message is received from another member of said affinity group;
   means for designating a period during which status updates are enabled.

20. A mobile communication device for allowing a member of an affinity group to send status information to and receive status information from other members of said affinity group, said mobile communication device comprising:
   a memory for storing member status information data;
   a transmitter for transmitting status update messages to other members of said affinity group when said member's status changes;
   a receiver for receiving status update messages from other members of said affinity group;
   a processor operatively connected to said memory for writing status information to and reading status information from said memory, said processor being programmed to:
      generate a status update message when said member's status changes for transmission by said transmitter to each other member of said affinity group; and
      update said status information stored in said memory when a status update message is received from another member of said affinity group;
   means for designating a period during which status updates are suppressed.

* * * * *